United States Patent [19]

Reid

[11] Patent Number: 4,637,158
[45] Date of Patent: Jan. 20, 1987

[54] ARCHIMEDIAN SCREW TYPE SPINNER LURE

[76] Inventor: Dennis D. Reid, P.O. Box 246, Schriever, La. 70395

[21] Appl. No.: 850,831

[22] Filed: Apr. 11, 1986

[51] Int. Cl.⁴ ............................................. A01K 85/00
[52] U.S. Cl. .................................... 43/42.19; 43/42.14
[58] Field of Search ................ 43/42.19, 42.20, 42.11, 43/42.12, 42.13, 42.14, 42.15, 42.16, 42.17, 42.18, 42.53, 42.36, 42.03

[56] References Cited

U.S. PATENT DOCUMENTS

| 1,617,318 | 2/1927 | Brown | 43/42.2 |
| 1,870,767 | 8/1932 | Brown | 43/42.17 |
| 2,493,431 | 1/1950 | Wold | 43/42.5 |
| 2,497,807 | 2/1950 | Wood | 43/42.5 |
| 2,722,766 | 11/1955 | Accetta | 43/42.36 |
| 3,153,298 | 10/1964 | Lemon | 43/42.03 |
| 3,245,171 | 4/1966 | Henry | 43/42.2 |
| 3,253,363 | 5/1966 | Steehn | 43/42.13 |
| 4,099,343 | 7/1978 | Enz | 43/42.19 |
| 4,201,006 | 5/1980 | Wetherald | 43/42.5 |
| 4,209,932 | 7/1980 | Pate | 43/42.11 |
| 4,257,183 | 3/1981 | Arms | 43/42.19 |

Primary Examiner—M. Jordan
Attorney, Agent, or Firm—Wilkinson, Mawhinney & Theibault

[57] ABSTRACT

The present disclosure is directed to a fishing jig having a pair of spring biased arms and a line connector therebetween and a head and hook surrounded by a plastic streamer on the free end of one arm and a spinner shaft attaching eye on the free end of the other arm. An archimedian lure having a spinner shaft having a pair of concentrically mounted archimedian screw spinners on the shaft one mounted on the shaft within the other.

6 Claims, 12 Drawing Figures

4,637,158

ARCHIMEDIAN SCREW TYPE SPINNER LURE

TECHNICAL FIELD

The present invention is directed to the fishing lure art and more particularly to the spinner lure specie of this art. A shaft connectable to a fishing line is provided upon which a spinner is freely rotatable with the form of spinner being an archimedian screw.

The spinner of the present lure comprises a pair of concentric archimedian screws, one rotatble within the other and wherein either the inner or outer external edge surface of the flight may be scalloped.

BACKGROUND OF THE INVENTION

The present invention is directed to the fishing lure art of the spinner lure type wherein the closest art known to me at the time of filing this application is U.S. PAT Nos. 1,870,767 to Brown of 1932; 2,493,431 to Wold of 1950; 2,497,807 to Wood of 1980; 4,201,006 to Wetherald of 1980; 4,209,932 to Pate of 1980; and 4,257,183 to Arms of 1981.

SUMMARY OF THE INVENTION

The present invention is directed to a fishing lure having a lure comprising an archimedian screw the flights of which may be scalloped along either or both edges of the flights of the screw of the spinner. The lure may also be a small short single archimedian screw spinner on a shaft swively mounted to the eye of a jig having two resiliently flexible spring based arms, one of which is connected to the spinner shaft, and the other of which has a hook surrouned by a plastic streamer shroud to camouflage the hook. The lure of the present invention may also comprise a pair of concentric archimedian screw spinners mounted coaxially and concentrically, one within the other with spacers between the bearing axis of rotation of each spinner to assure free rotation of both as they are drawn or pulled through the water.

A further modification to the archimedian screw spinner lure is to stamp out and up strike a finger nail-like projection on each alternation of the spiral flight on opposite sides of the blade to cause the generation of pressure differentials to vary lure turbulence and attract fish attention.

BEST MODE FOR CARRYING OUT THE INVENTION

Figure 1:
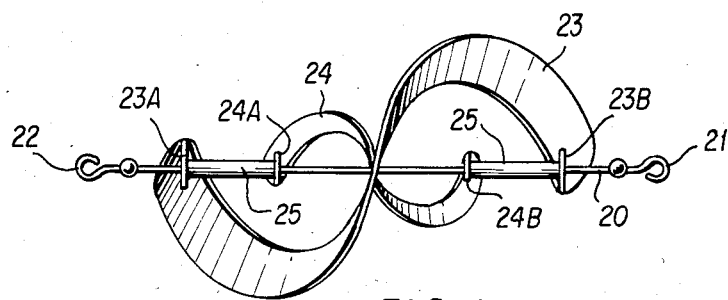
FIG. 1 is a side elevational view of my double concentric coaxial archimedian screw spinner lure constructed in accordance with my new lure.
Figure 2:
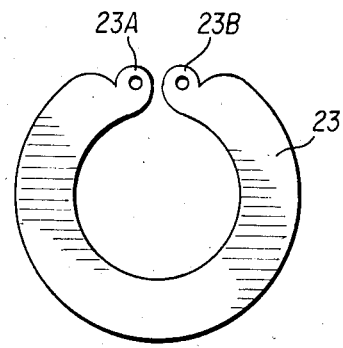
FIG. 2 is a plan view of a template top plan view for stamping out a spinner for forming the inner and outer spinners of FIG. 1.

Referring now to FIG. 1, one embodiment of my invention is shown in which a shaft 20 has a line attaching eye 21 at one end and hook attaching eye 22 at the other end. Rotatably mounted on the shaft 20 are two archimedian screw spinners 23, 24. The outer or larger spinner 23 has shaft bearing mounts 23A and 23B while the smaller archimedian screw 24 has bearing mounts 24A and 24B. The two spinners are spacially positioned from one another along the shaft 20 by spacer tubes 25 which are freely receivable over shaft 20 and have a thickness which abut the spinner shaft bearing mounts 23A, 24A and 23B, 24B to properly position the smaller spinner 24 for free rotation within the flight of the outer spinner 23. Any two different sizes of spinner can be used as long as the smaller spinner 24 has an external diameter smaller than the inside drawn diameter of the outside spinner 23, regardless of the direction of rotation. This lure, FIG. 1, at a slightly faster than normal retrieve will cause the lure to rise to the surface and disturb and splash the water while making a plopping sound due to spinning. Also this lure will sink vertically with no tension on line causing spinners to rotate in opposite direction provided lure has ample weight attached to the rear end of lure, as for example with a treble hook. The blades of the spinners 23, 24 may be made of a number of different materials, i.e. plastic, aluminum which may be painted or plated of different colors or even a textured surface applied to the blades of the spinners. The spinner of the double lure of FIG. 1 could be made from the template of FIG. 2 wherein the blade of the spinner 23 has two bearing surfaces 23A and 23B and the blade of spinner 24 has two bearing surfaces 24A and 24B.

Figure 3:
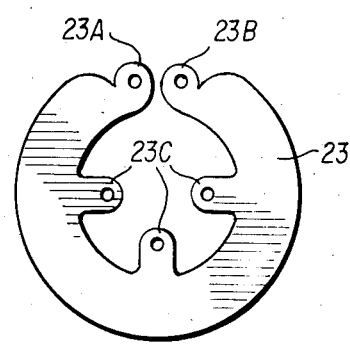
FIG. 3 is a top plan view of a template for stamping out a spinner for forming a single spinner lure as employed in FIGS. 6, 7 and 8.

As shown in FIG. 3, the blade of a single spinner 23 may have up to five bearing mounts 23C, or may be attached by a plurality of bearing mounts 23C along any point of the inner flight.

Figure 4:
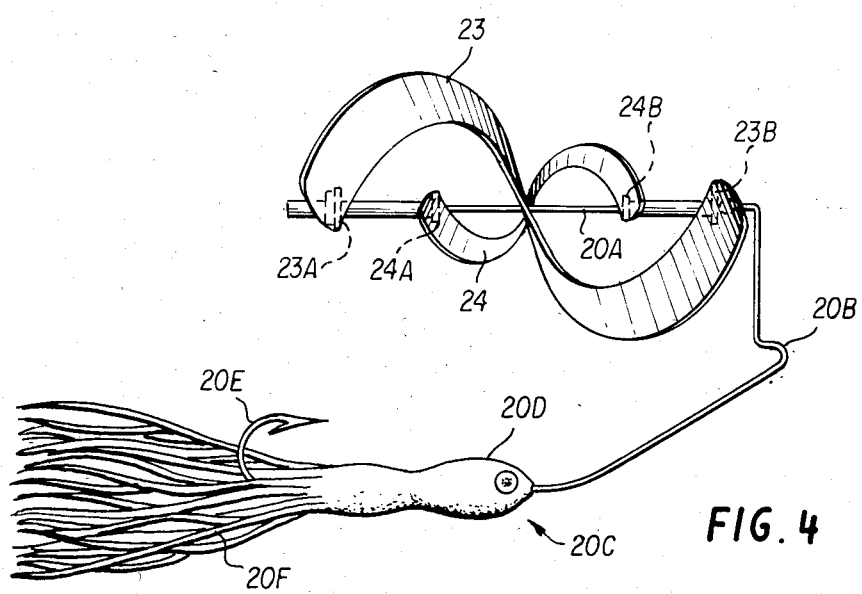
FIG. 4 is a side elevational view of the spinner lure of FIG. 1 attached to a jig having a head, hook and plastic streamer shroud about the hook.
Figure 5:
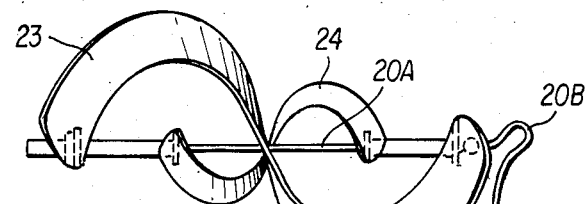
FIG. 5 is a view similar to FIG. 4 with the line attaching point along the spinner axis and the jig head positioned forwardly of its attachment in FIG. 4.
Figure 5:
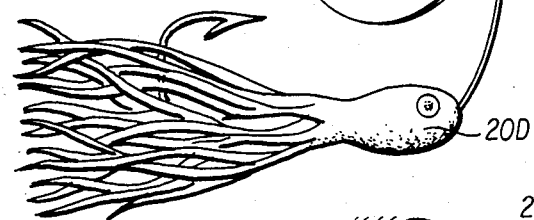

Referring now to FIGS. 4 and 5, the lure shaft 20A is a wire which passes through the bearing mounts 23A, 23B of spinner 23 and mounts 24A, 24B of spinner 24 having a line attaching loop 20B leading downwardly to a jig 20C having a head 20D, a hook 20E and a plastic streamer shroud 20F about the hook 20E. In the lure of FIG. 5, the head 20D is forwardly of the lure head of FIG. 4.

Figure 6:
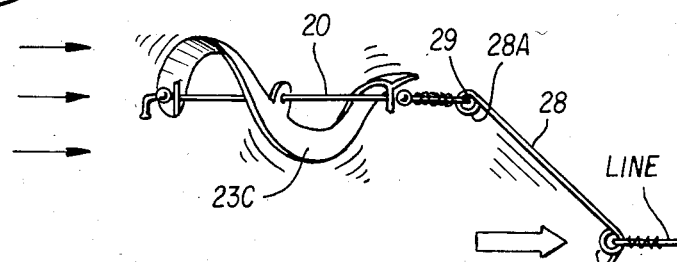
FIGS. 6 through 8 are side elevational sequence views of spinner position and action during pumping action of rod handling of line during retrieving of lure employing my form of single small swivelly attached spinner to my jig with arrow indicating the direction of line pull.
Figure 7:
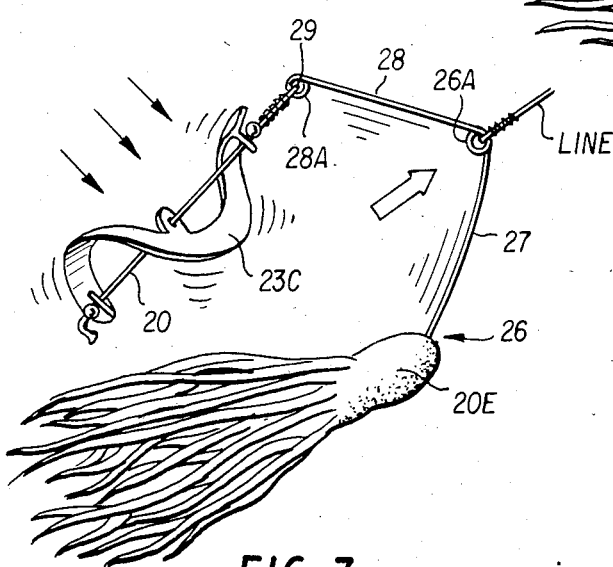
Figure 8:
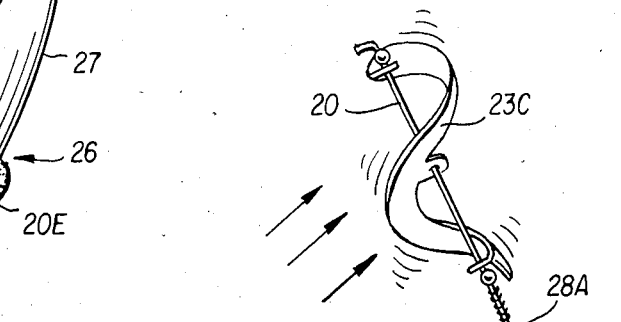
Figure 8:
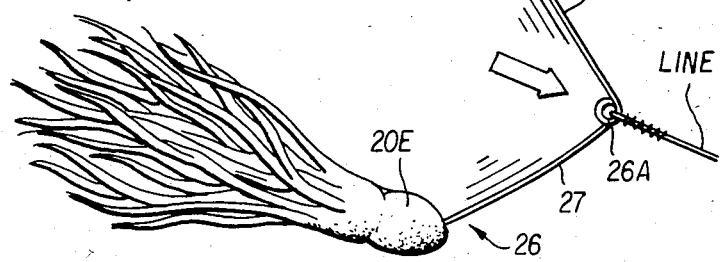

Referring now to FIGS. 6, 7 and 8, a lure in accordance with my invention is constructed of jig 26 made from spring resilient wire having a spring loop 26A from which arms 27, 28 extend. The free end of arm 28 has a loop 28A to which the shaft 20 of a single spinner 23C is swivelly attached at 29 to the loop 28A of arm 28.

The head 20E, hook and plastic shroud are connected to arm 27. The spinner of FIGS. 6 through 8 have three bearing surfaces in contact with shaft 20C and round spheres such as beads limit the axial position of the spinner along the shaft.

Due to the swivel mount of the shaft 20 at 29 this swivel makes the spinner free to follow the path of draft of the jig 26, indicated by the arrow in each of FIGS. 6 through 8 which is occasioned by the pumping action of the fisherman's rod while retrieving the line.

Either of the two lures of FIGS. 4 and 5 can be fitted with combination, or single spinner. Just as almost any spinner bait could, provided the lure has enough wire available aft of the tie off point. On lures with not enough wire available aft of the tie off point these types of spinners can still be attached with very uncommon and surprising results. All that is needed is a typical spinner bait and a copy of the spinner in FIGS. 1, 2 or 3. The spinner itself should be attached to a separate wire shaft and then connected to lure itself whereby the spinner shaft is not a rigid attachment to lure itself. When the lure of FIGS. 6 to 8 is used, if the fisherman uses an up and down pumping motion with his rod tip the lure will rise and fall as it is retrieved. At the same time the spinner will also rise and fall but not at the same rate as the lure. Thus giving the complete lure a somewhat lifelike effect as in two creatures swimming together. The pumping motion on retrieval gives the spinner section a whiplike action while spinning at the same time. Another feature of this rig up is that when retrieval is stopped for a moment the lure will of course sink causing spinner and shaft to angle vertically and continue to spin until reaching bottom. This feature is done with no input from the fisherman whatsoever. This is one of the things that makes this spinner so unique. Some spinners will wobble, flutter, or make some sort of spin. On the other hand after forward progress has stopped with this spinner, its complete motion continues uninterruped until reaching bottom or mouth of hungry fish, whichever comes first. This is true for the following type of lure, see FIGS. 6, 7 and 8.

In FIG. 8 the position of the jig and spinner is shown as the rod drops and retrieval stops. The spinner will continue to rotate until the lure stops. This should be attractive to fish. Whatever the direction of the lure the spinner shaft and spinner align evenly in that direction. Aside from the slight whipping action which occurs when directions change due to pumping action and/or combined with irratic retrieve.

Figure 9:
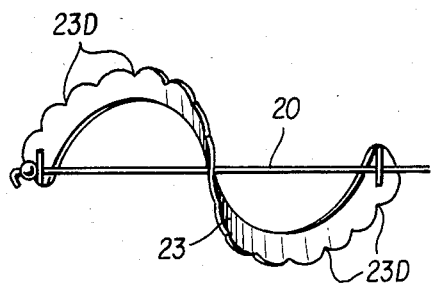
FIG. 9 is a side elevational view of a single archimedian screw spinner lure of my invention having the outer surface edges of the screw flight scalloped.
Figure 10:
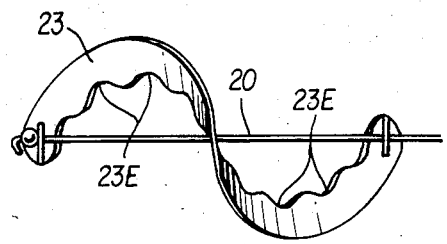
FIG. 10 is a side elevational view of a single archimedian screw spinner lure of my invention having the inner surface edges of the screw flight scalloped.
Figure 11:
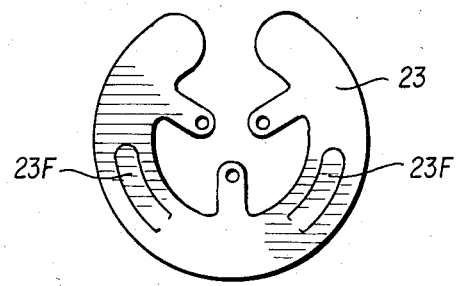
FIG. 11 is a top plan view of the template for making the lure of FIG. 12.

As shown in FIG. 9, the outer edge 23D of the flight of screw 23 is scalloped and in FIG. 10 the inner edge 23E of the flight 23 is scalloped.

Figure 12:
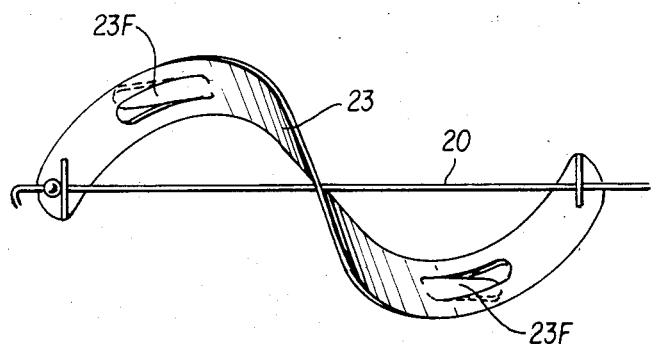
FIG. 12 is a side elevational view of a modified form of my archimedian screw lure having reversely upstruck finger nail-like projections on the flat of the screw flight.

As shown in FIG. 12, further enhancement of the hereinbefore mentioned spinners may be made by a built in scooplike device 23F that would create high and low pressures as the spinner is pulled through the water resulting in fish attracting turbulence. These scoops 23F may be placed at different points along the blade with one or more facing different directions and on different sides of the blade. These scoops 23F can also be placed at different angles to the blade edge.

What I claim is:

1. An archimedian screw spinner lure comprising a shaft having a line connector at one end and a hook and bait connector at the other end, a first archimedian screw spinner rotatably mounted on said shaft, a second archimedian screw spinner having an internal flight diameter greater than the external flight diameter of said first screw so that said first screw spinner will freely rotate within said second screw spinner, and spacer means carried by said shaft positioned between the rotary mounts of said first and second archimedian screw to position the first and second screws so that each may rotate relative to the other in either clockwise or counterclockwise direction depending upon flight direction of each screw to assure free independent movement of each screw relative to one another.

2. A lure as claimed in claim 1 further comprising a jig connected to the leading end of said spinner shaft, said jig having a head and hook surrounded by a plastic streamer shrouding the hook, said jig having at least one resilient arm spring biased from a line attaching eye with the head and hook connected to the free end of one arm and the spinner shaft swivelly connected to the other arm.

3. An archimedian screw spinner lure as claimed in claim 1 wherein said archimedian screw spinner has scalloped external edges along the flight of the screw spinners.

4. An archimedian screw spinner lure as claimed in claim 1 wherein said archimedian screw has scalloped edges along the internal surface edge of the flight of the screw spinners.

5. An archimedian screw spinner lure as claimed in claim 1 wherein the flight of the screw spinners have tongues upstruck from the surface of the flight of each screw spinners to cause areas of pressure change along the flight of each screw spinner causing turbulent movement to the lure to attract the attention of fish.

6. Fishing jig having a pair of spring biased arms having a line connector therebetween and a head and hook surrounded by a plastic streamer on the free end of one arm and a spinner shaft attaching eye on the free end of the other arm; an archimedian lure comprising a spinner shaft, having an inner archimedian screw spinner with inner and outer flights and an outer archimedian screw spinner with inner and outer flights, the outer flight of said inner archimedian screw spinner being less than the internal diameter of said outer archimedian screw spinner so that the inner archimedian screw spinner rotates freely within and independently of said outer archimedian screw spinner.

* * * * *